United States Patent [19]

Okamura et al.

[11] Patent Number: 5,034,839
[45] Date of Patent: Jul. 23, 1991

[54] STRUCTURES FOR FIXEDLY SUPPORTING TAPE GUIDES IN A MAGNETIC TAPE CASSETTE

[75] Inventors: Masatoshi Okamura, Saku; Haruo Shiba, Komoro; Takashi Namioka, Saku, all of Japan

[73] Assignee: TDK Corporation, Tokyo, Japan

[21] Appl. No.: 304,387

[22] Filed: Jan. 30, 1989

[30] Foreign Application Priority Data

| Feb. 3, 1988 | [JP] | Japan | 63-12593 |
| Feb. 3, 1988 | [JP] | Japan | 63-12594 |
| Aug. 17, 1988 | [JP] | Japan | 63-107598 |

[51] Int. Cl.⁵ .................. G11B 15/60; G11B 23/04
[52] U.S. Cl. ........................ 360/132; 242/76; 242/199
[58] Field of Search ............ 360/132, 93; 242/199, 242/76; 226/196

[56] References Cited

U.S. PATENT DOCUMENTS

| 3,666,203 | 5/1972 | Sato et al. | 360/132 |
| 3,751,043 | 8/1973 | Bracci | 360/132 |
| 4,231,532 | 11/1980 | Popov et al. | 360/132 |
| 4,466,585 | 8/1984 | Maehara | 360/132 |
| 4,558,387 | 12/1985 | Shiba et al. | 360/132 |
| 4,700,254 | 10/1987 | Oishi et al. | 360/132 |
| 4,706,148 | 11/1987 | Komiyama et al. | 360/132 |

Primary Examiner—John H. Wolff
Assistant Examiner—Craig A. Renner
Attorney, Agent, or Firm—Seidel, Gonda, Lavorgna & Monaco

[57] ABSTRACT

A tape cassette comprises a cassette casing composed of upper and lower halves, wherein fixed tape guides each having a partially or completely cylindrical configuration are disposed along a tape transportation path defined within the casing. Each of the tape guides is secured fixedly by press-fitting it onto a continuous or discontinuous polygonal supporting rib dimensioned to be circumscribed by the tape guide.

8 Claims, 15 Drawing Sheets

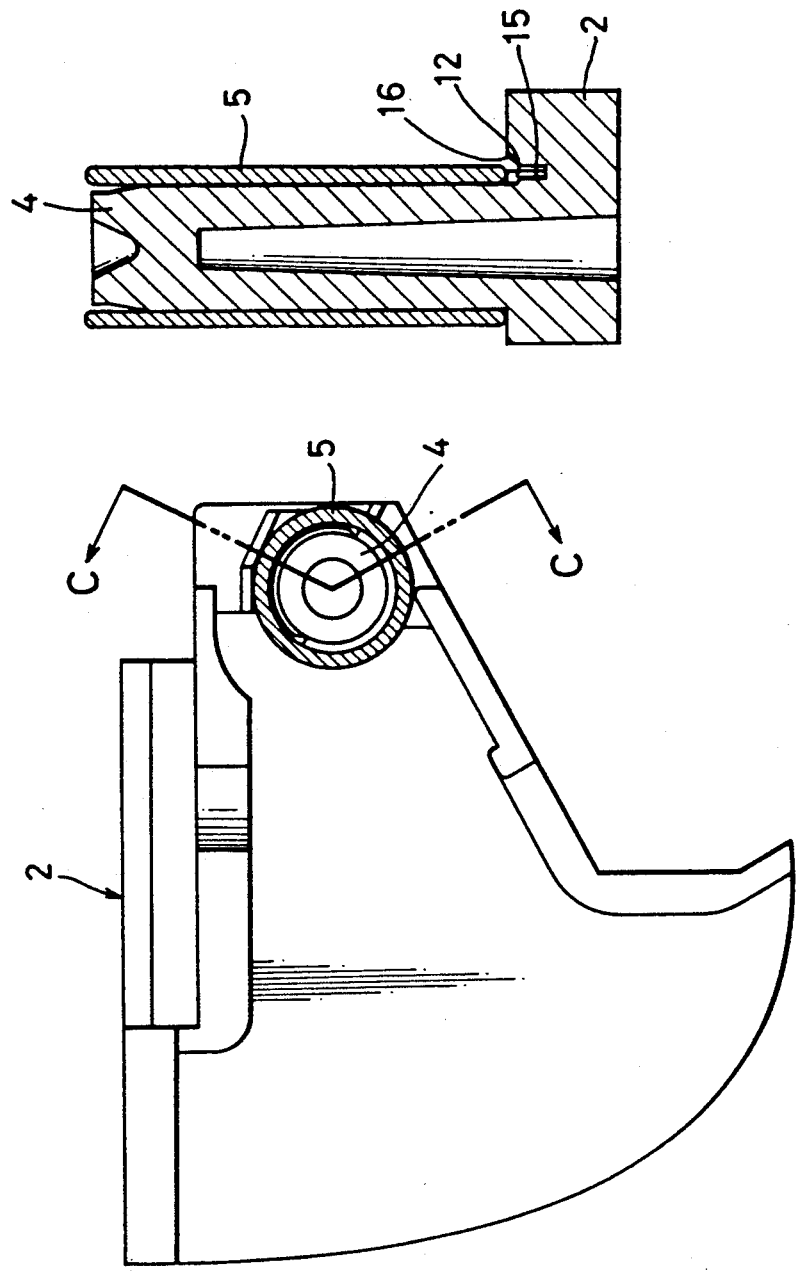

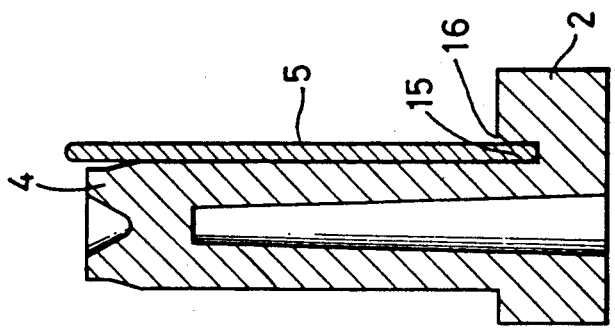
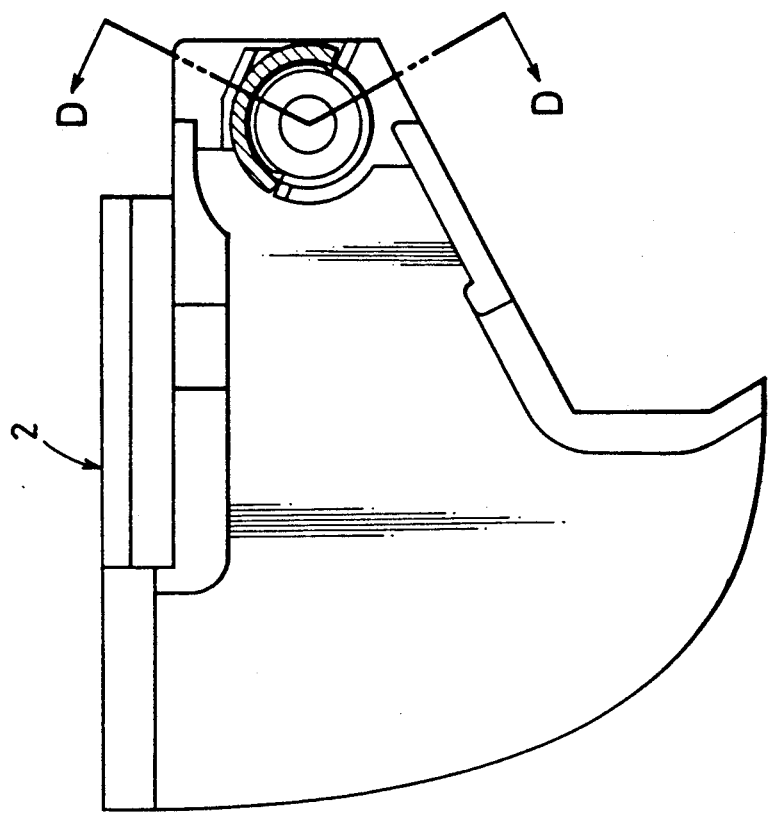

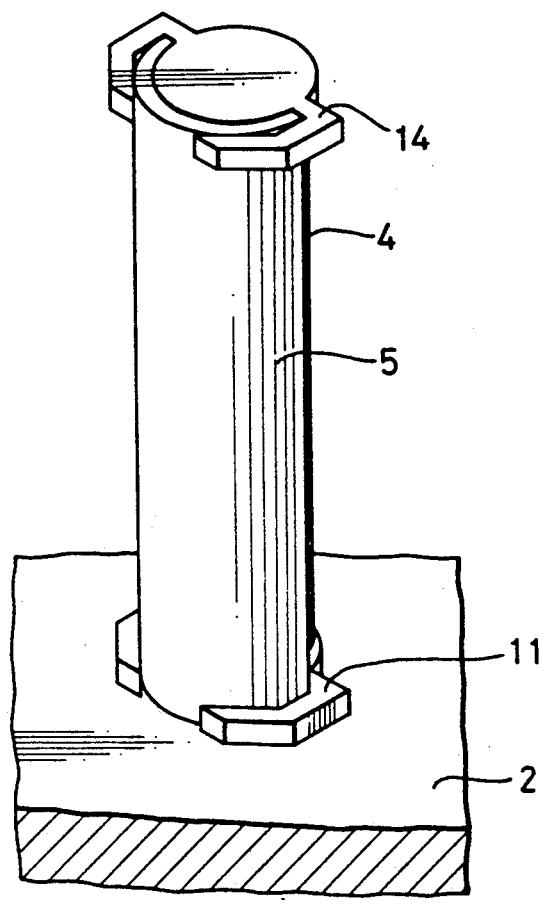

STRUCTURES FOR FIXEDLY SUPPORTING TAPE GUIDES IN A MAGNETIC TAPE CASSETTE

BACKGROUND OF THE INVENTION

1. Field of the Invention

The present invention generally relates to a magnetic tape cassette and more particularly to a structure for fixedly supporting a tape guide in the magnetic tape cassette.

2. Description of the Prior Art

In a cassette tape assembly such as a video tape cassette, there is usually provided tape guide means for guiding properly the transportation of a magnetic tape. FIG. 1 of the accompanying drawing is an exploded perspective view of a casing of a video tape cassette showing in detail only the tape guide mechanism for the facilitation of understanding.

Referring to the figure, reference numeral 1 denotes an upper casing half and 2 denotes a lower casing half. Mounted in the lower casing half 2 of the cassette along a path of tape transportation are a metallic guide pin 3, a fixed metallic cylindrical tape guide 5 supported by a supporting pin 4 of a plastic material, a fixed metallic cylindrical tape guide 7 supported by a plastic supporting pin 6 and a plastic guide roller 9 supported on a plastic pin 8 which are disposed in this order as viewed from the magnetic tape feeding side. Among these guide members, the tape guides 5 and 7 play the most important role. Since these tape guides must be of a low friction and have a high abrasion withstanding capability in order to ensure a proper transportation of the magnetic tape, they are usually formed of a metal such stainless steel, a hard-plated brass or the like and finished with high precision.

Typical mounting methods of the cylindrical tape guides 5 and 7 adopted heretofore are illustrated in FIGS. 2, 3, 4 and 5 of the accompanying drawings. In this conjunction, reference may be made, for example, to Japanese Utility Model Publication No. 35985/1981, the gist of which is depicted in FIGS. 2, 3, 4 and 5 and is briefly discussed below. Referring to the figures, the upstanding supporting pin 4 is anchored in a supporting platform 10 formed in the lower casing half 2 and the cylindrical tape guide 5 is fitted around the supporting pin 4. In the state where the upper half 1 is assembled on the lower half 2, the tape guide 5 is sandwiched under pressure between the supporting platform 10 of the lower half 2 and that of the upper half, whereby the tape guide 5 is fixedly secured.

A semi-cylindrical tape guide has also been proposed from the view point of reducing the cost of material and for other reasons. Typical examples of such semi-cylindrical tape guide are disclosed, for example, in Japanese Utility Model Publications Nos. 3420/1984 and 5660/1986. According to these publications, the mounting of the semi-cylindrical tape guide has heretofore been realized by using a bonding agent or a bilateral adhesive tape.

With the tape guide mounting techniques known heretofore, however, the position of the tape guide can not always be established with satisfactory accuracy. The reason may be explained by the fact that difficulty is encountered in realizing precisely the diameter and the true circularity of a part for forming the pin 4 in a die for molding the lower half (as well as the upper half) in case the tape guide is cylindrical. In order to solve this problem, a precise finishing is required, which however involves a very time-consuming processing, leading to a significant increase in the manufacturing cost. In general, it is very difficult to assure the true circularity and precision size for the pin 4, giving rise to a problem that the tape guide can not be fitted on the supporting pin 4 because of tightness or tape guide rotates or jolts around the pin 4 due to looseness.

On the other hand, in the case of the semi-cylindrical tape guide, variation in the amount of the bonding agent and the thickness of the bilateral adhesive tape presents a cause for positional deviation or variation of the guide, making it difficult to control precisely the position of the tape guide. Besides, after the mounting of the semi-cylindrical tape guide, degradation in the strength of adhesion in the course of time lapse presents another problem to be solved.

A further problem can be seen in that the tape guides are secured to the tape cassette by using the supporting means designed specifically for the guides, respectively. Consequently, the structures of the upper and lower halves of the cassette casing necessarily differ in dependence on the types of tape guides, to serious disadvantage for the manufacture.

SUMMARY OF THE INVENTION

Accordingly, an object of the present invention is to provide a supporting structure capable of precise positioning and fixing of the tape guide in magnetic tape cassette.

Another object of the present invention is to make it possible to use a same tape cassette regardless of difference in the type of the tape guide.

More specifically, an object of the present invention is to provide a magnetic tape cassette in which semi-cylindrical or cylindrical tape guides can be fixedly secured.

Still another object of the invention is to provide a tape cassette having a tape guide supporting structure which allows the tape guide to be positioned with high accuracy and fixed in a much facilitated manner.

In view of the above objects, there is provided according to an aspect of the present invention a tape cassette which comprises a cassette casing composed of upper and lower halves, wherein fixed tape guides each having a cylindrical or semi-cylindrical configuration and disposed along a tape transportation path defined within the casing are each fixedly secured by press-fitting it into recess defined by a continuous or discontinuous polygonal supporting rib so dimensioned that the inner surface of the rib contacts the outer superiphery of the tape guide at a plurality of points.

According to another aspect of the present invention, there is further provided a magnetic tape cassette which comprises a cassette casing composed of upper and lower halves, semi-cylindrical tape guides disposed fixedly on a tape transportation path within the casing, supporting pins for the fixed tape guides which pins are anchored in the inner surface of at least one of the casing halves, wherein a polygonal outer wall contacting the fixed tape guide is formed in the upper and lower casing halves on the tape guide supporting (sandwiching) surfaces thereof around each of the supporting pins.

By virtue of the structure according to the present invention in which the outer wall for supporting the base portion of the tape guide is formed in a polygonal shape, the contact between the tape guide and the supporting rib is realized through only a small number of pointwise contacts, whereby the molding die can be designed and manufactured in a much facilitated manner as compared with the conventional die whose rib forming portion must be finished with high precision and true circularity. Thus, manufacturing and assembling of the tape guide with high accuracy can be accomplished very easily.

According to a preferred embodiment of the invention, there can be realized a magnetic tape cassette provided with an improved tape guide structure which allows both the cylindrical tape guide and the semi-cylindrical tape guide to be used selectively or in combination. Further, since the same casing half can be used even when the tape guide is selected in conformance with the type of the tape to be used, high efficiency of assembling process as well as inexpensiveness of the casing halves can be accomplished. Besides, even when the tape guide provided on the tape feeding side differs in the shape from the guide disposed on the winding side, it is possible to use the supporting structure of the same configuration. Additionally, upon positioning the cylindrical and/or semi-cylindrical tape guide, the outer peripheral surface of the tape guide finished with high precision is brought into engagement with the polygonal outer wall through only a small number of point contacts. Accordingly, by determining these contact points accurately, the precise positioning can be accomplished. To this end, a molding die provided with the small number of points with high precision can be designed and manufactured extremely easily when compared with the die required for forming the annular rib having the true circularity.

BRIEF DESCRIPTION OF THE DRAWINGS

FIG. 12 is a top plan view of the same;

FIG. 13 is a sectional view taken along a line C—C in FIG. 12;

FIG. 16 is a top plan view of the same;

FIG. 17 is a sectional view taken along a line D—D in FIG. 16;

FIGS. 18(a) to 18(c) show a tape guide and a supporting structure therefor according to still another embodiment of the invention, in which FIG. 11(a) is a perspective view, FIG. 11(b) is a horizontal sectional view and FIG. 11(c) is a vertical sectional view;

FIGS. 22(a) to 22(c) show a tape guide and a supporting structure therefor according to another embodiment of the invention, in which FIG. 22(a) is a perspective view, FIG. 22(b) is a horizontal sectional view and FIG. 22(c) is a vertical sectional view;

FIGS. 23(a) to 23(c) show a tape guide and a supporting structure therefor according to still another embodiment of the invention, in which FIG. 23(a) is a perspective view, FIG. 23(b) is a horizontal sectional view and FIG. 23(c) is a vertical sectional view;

FIGS. 24(a) to 24(c) show a tape guide and a supporting structure therefor according to yet another embodiment of the invention, in which FIG. 24(a) is a prospective view and FIG. 24(c) is a vertical sectional view;

FIG. 25 is a perspective view showing a tape guide and a supporting structure therefor according to a further embodiment of the invention; and FIGS. 26(a) to 26(c) show a tape guide and a supporting structure therefor according to a still further embodiment of the invention, in which FIG. 26(a) is a perspective view, FIG. 26(b) is a horizontal sectional view and FIG. 26(c) is a vertical sectional view.

DESCRIPTION OF THE PREFERRED EMBODIMENTS

Now, the invention will be described in detail in conjunction with exemplary and preferred embodiments by reference to the drawings.

Figure 1:
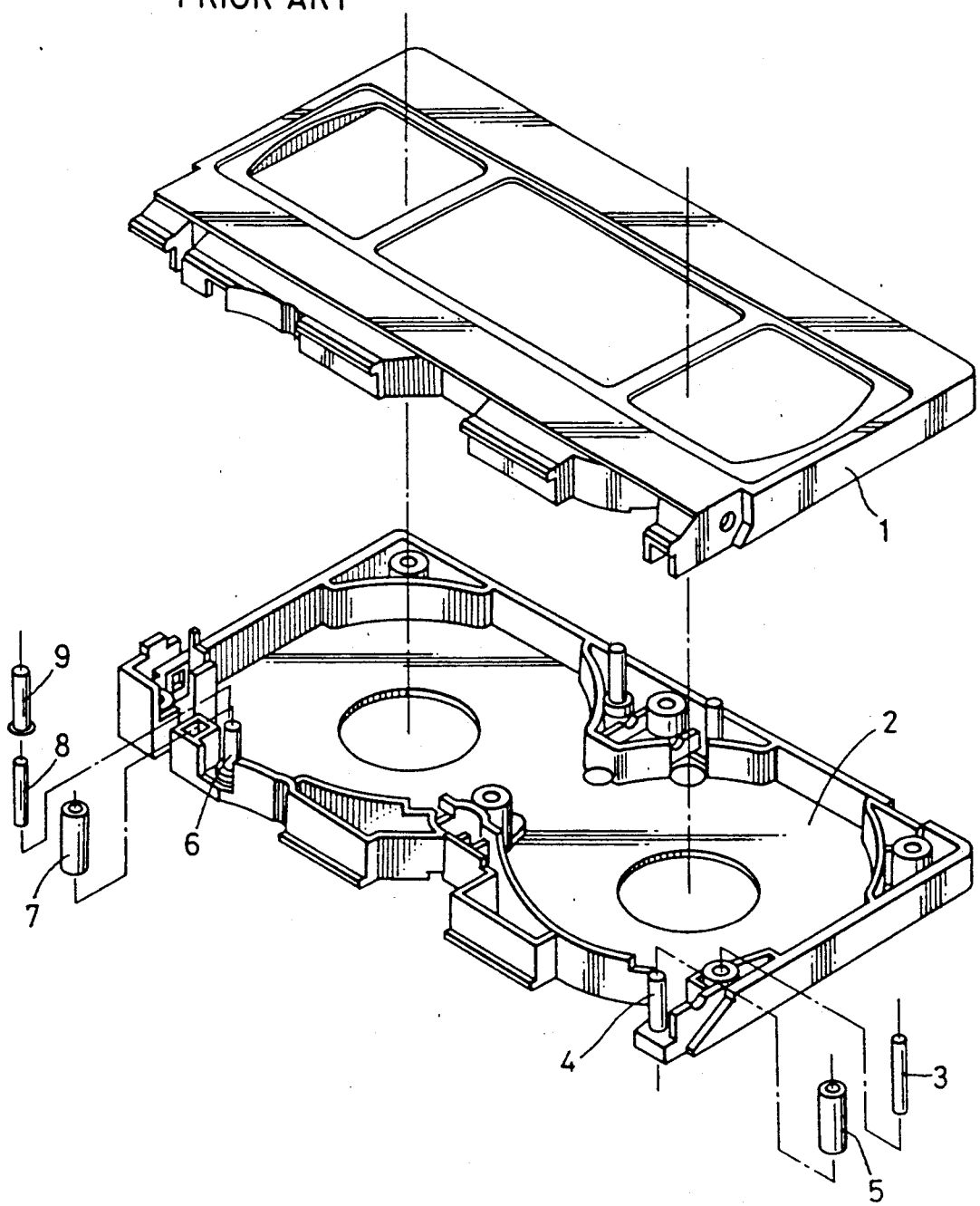
FIG. 1 is an exploded perspective view of a magnetic tape cassette to which the present invention can be applied.

The following description is directed to a magnetic tape cassette having a structure which allows a cylindrical tape guide and a semi-cylindrical tape guide to be selectively mounted. It should however be understood that the teachings of the present invention may equally be applied to a magnetic tape cassette in which the fixed cylindrical tape guide is not used. Further, the structure which is required only for supporting fixedly the cylindrical tape guide may be omitted in the lower casing half. The tape guide may be made of a metallic material such as stainless steel, a hard-plated brass or the like and is imparted with an outer surface finished accurately by precision polishing. The tape guide according to the present invention is intended to be used for each of the tape guides 5 and 7. In the following description, it is assumed, by way of example only, that the invention is applied to the tape guide 5, being understood that it represents both the tape guides. Since the structure of the cassette casing has already been described by reference to FIG. 1, any further description will be unnecessary. Although the description of the embodiments of the invention will be made in conjunction with the lower half of the cassette casing, it should be appreciated that the upper half may also be implemented in the like structure.

Since the fixed semi-cylindrical tape guide is naturally destined for guiding a magnetic tape, it must be disposed at such a position and orientation to be capable of contacting the magnetic tape. The angle over which the tape guide is brought into contact with the magnetic tape is commonly in a range of about 100 to 110 degrees on the tape feeding side and in a range of about 135 to 145 degrees on the tape winding side. Accordingly, the function of guiding the magnetic tape can satisfactorily be achieved even by using the fixed semi-cylindrical tape guide.

FIGS. 6 to 9 show a structure of a main portion of the lower half 2 of a tape cassette according to an exemplary embodiment of the invention. FIGS. 10 to 13 show the structure in the state in which a cylindrical tape guide 5 is mounted. On the other hand, FIGS. 14 to 17 show the same structure having, however, a semi-cylindrical tape guide mounted therein.

Referring to FIGS. 6 to 9, a tape guide supporting structure provided on the inner surface of the lower half 20 of the cassette casing includes a supporting pin 4 which can engage with the bore of the cylindrical tape guide 5 and has a diameter same as or only slightly smaller than the inner diameter of the tape guide 5 and a platform or supporting surface 10 formed around the base portion of the supporting pin 4 for supporting the bottom end of the tape guide. By virtue of this structure, the cylindrical tape guide can fixedly be supported.

Figure 2:
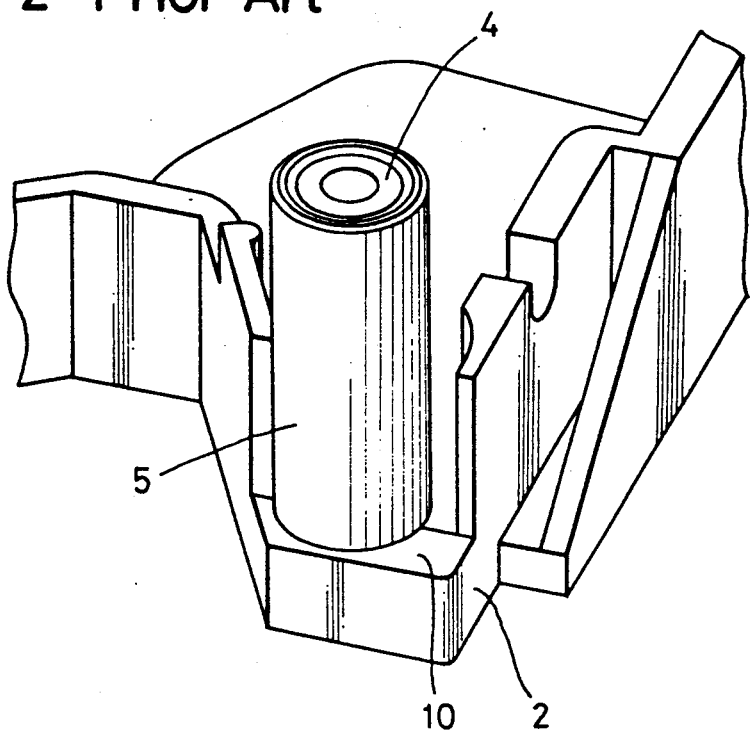
FIG. 2 is a front perspective view showing a hitherto known cylindrical tape guide and a supporting structure therefor.
Figure 3:
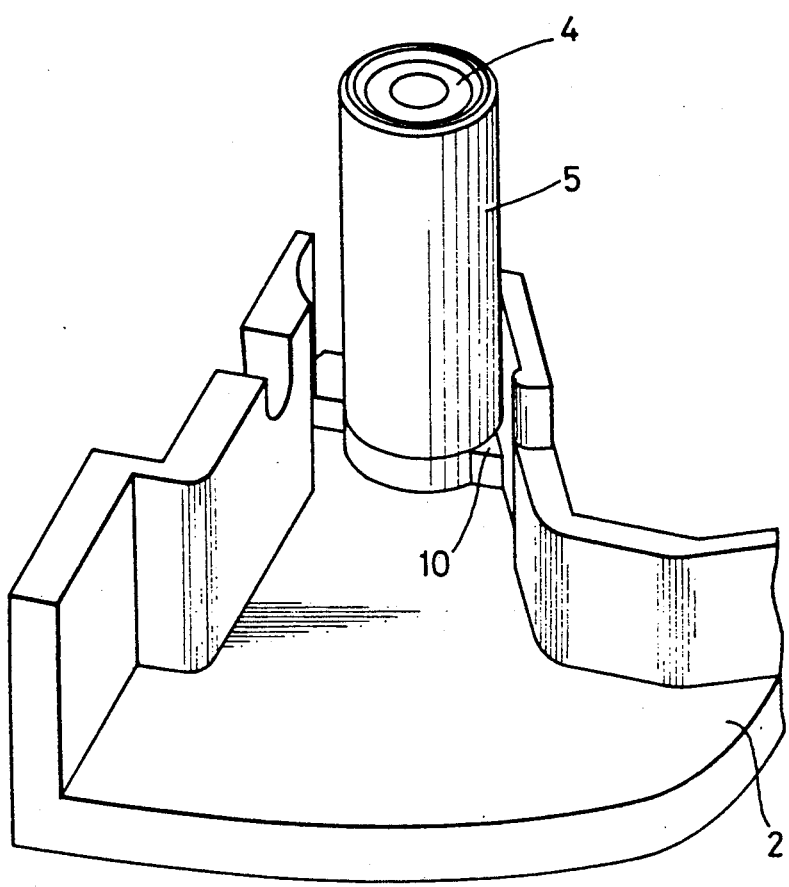
FIG. 3 is a rear perspective view of the same.
Figure 4:
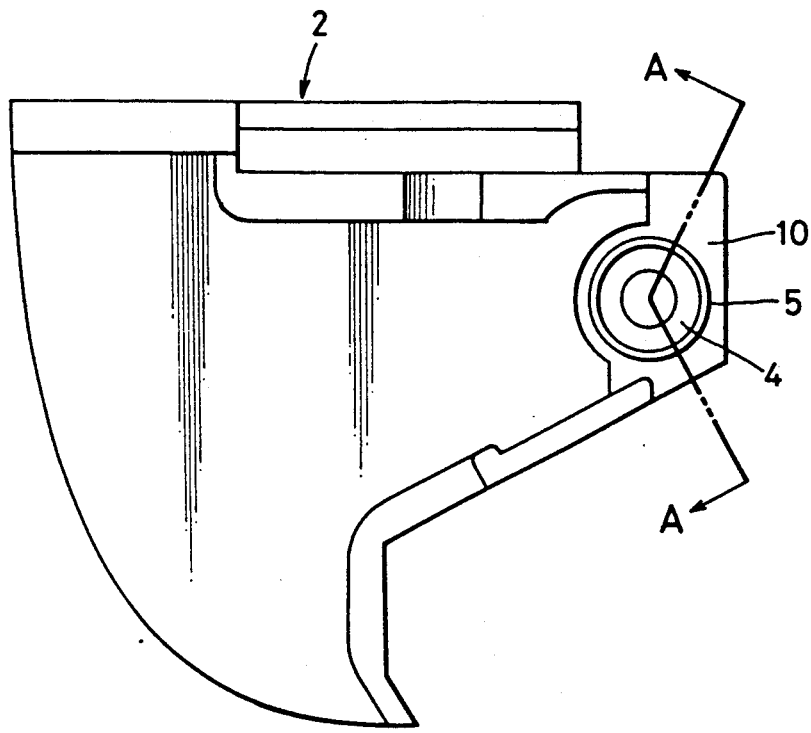
FIG. 4 is a top plan view of the same.
Figure 5:
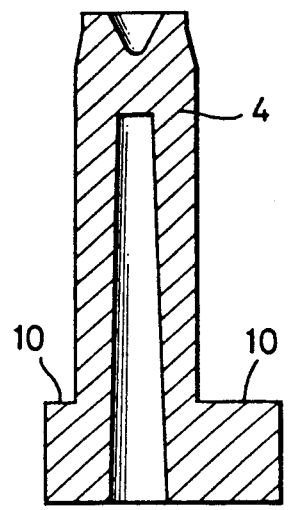
FIG. 5 is a sectional view taken along a line A—A in FIG. 4.
Figure 6:
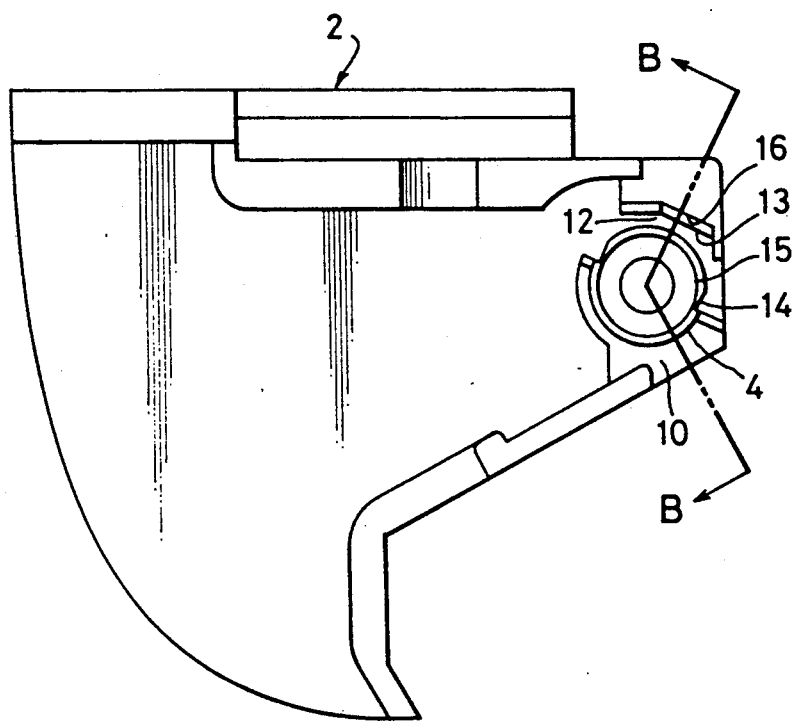
FIG. 6 is a top plan view showing a tape guide and a supporting structure therefor according to an embodiment of the present invention.
Figure 7:
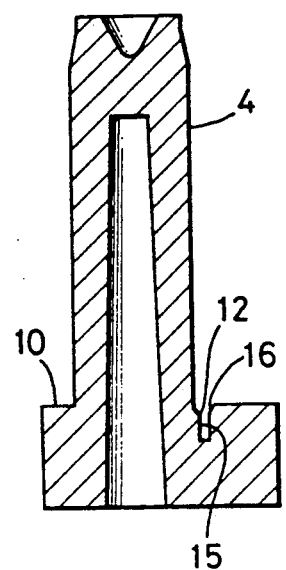
FIG. 7 is a sectional view taken along a line B—B in FIG. 6.
Figure 9:
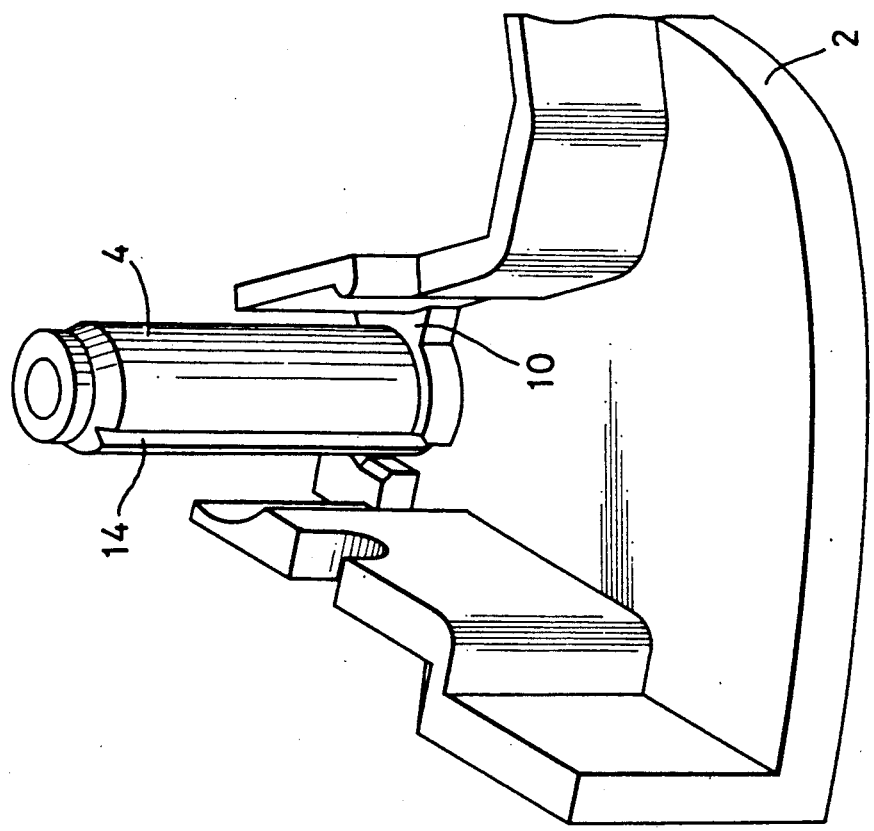
FIG. 9 is a rear perspective view of the same.
Figure 8:
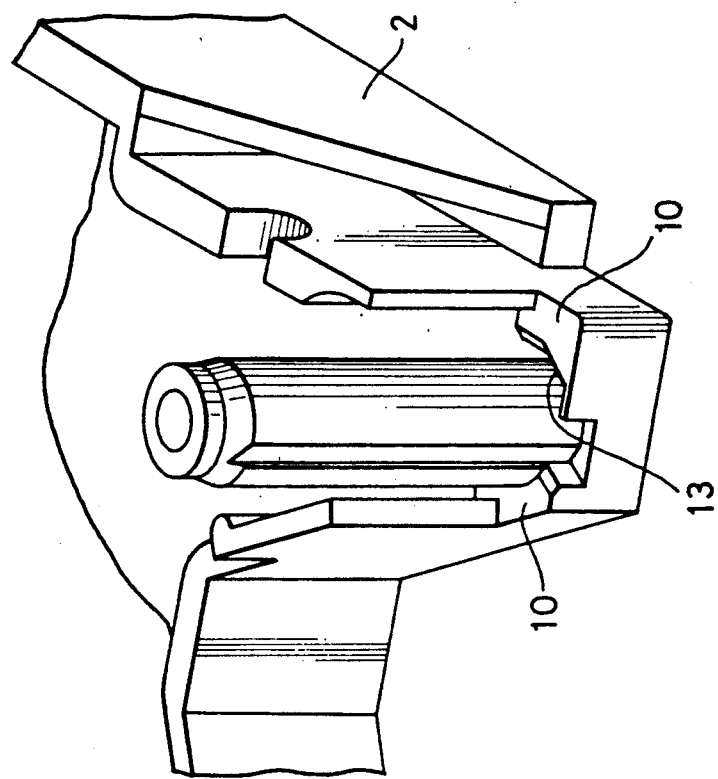
FIG. 8 is a front perspective view showing the tape guide supporting structure according to the above embodiment of the invention.
Figure 11:
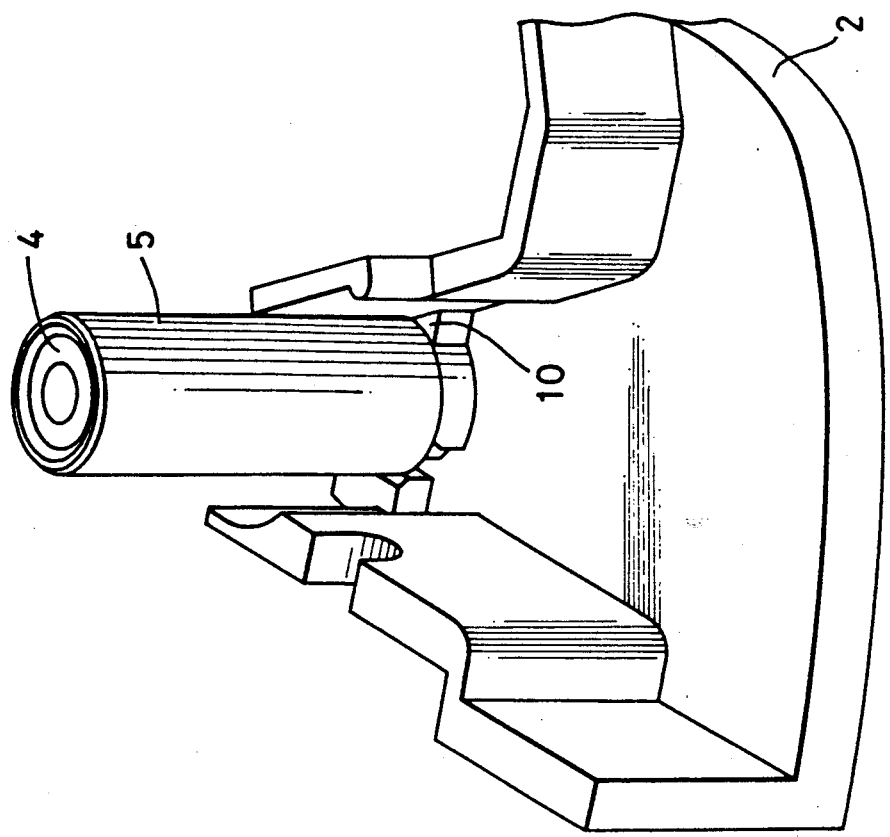
FIG. 11 is a rear perspective view of the same.
Figure 10:
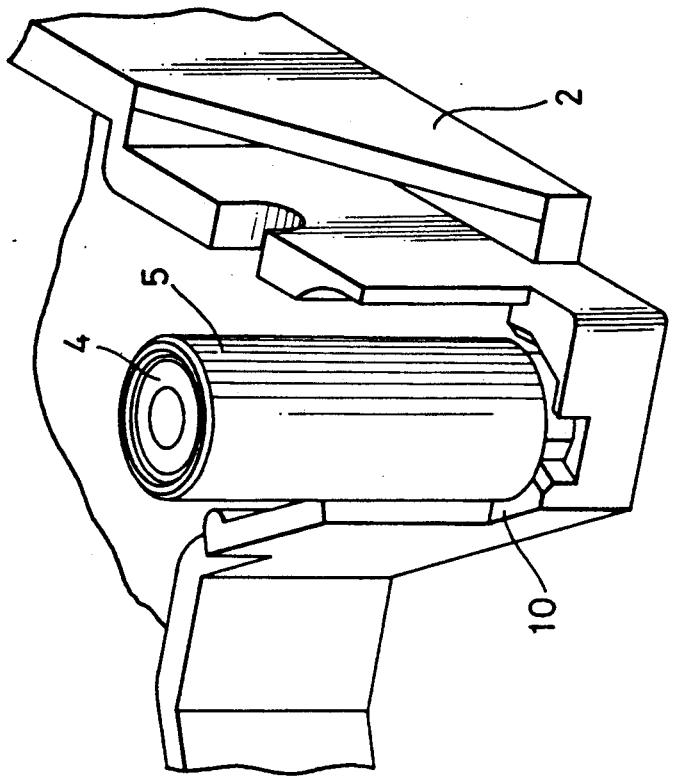
FIG. 10 is a front perspective view showing a cylindrical tape guide and a supporting structure therefor according the present invention.
Figure 15:
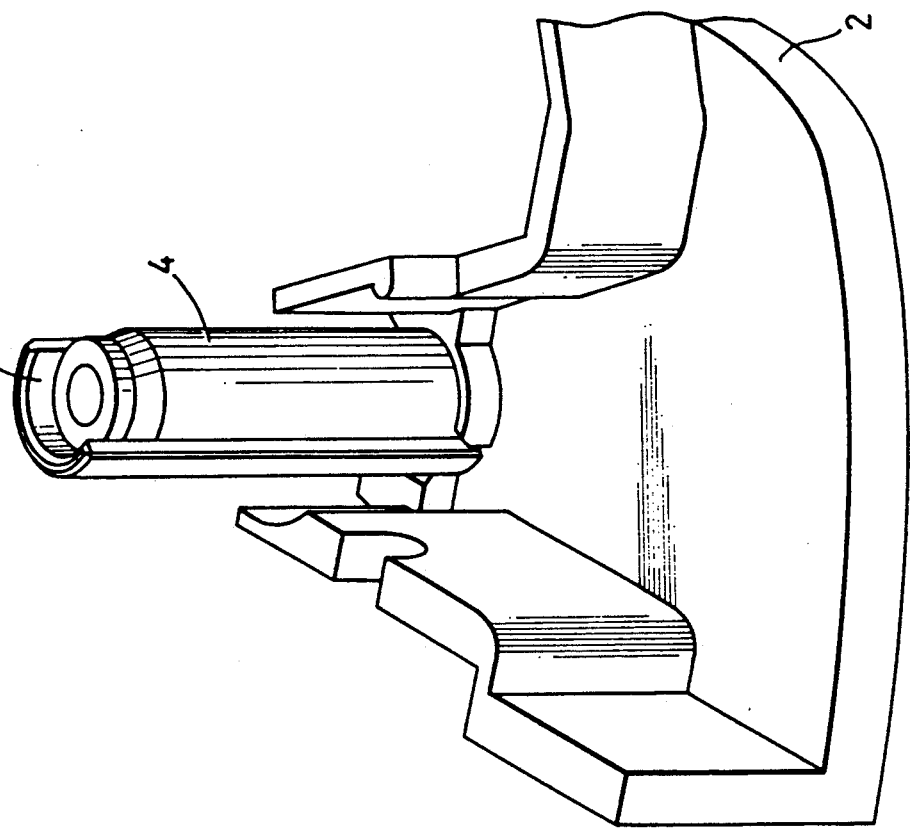
FIG. 15 is a rear perspective view of the same.
Figure 14:
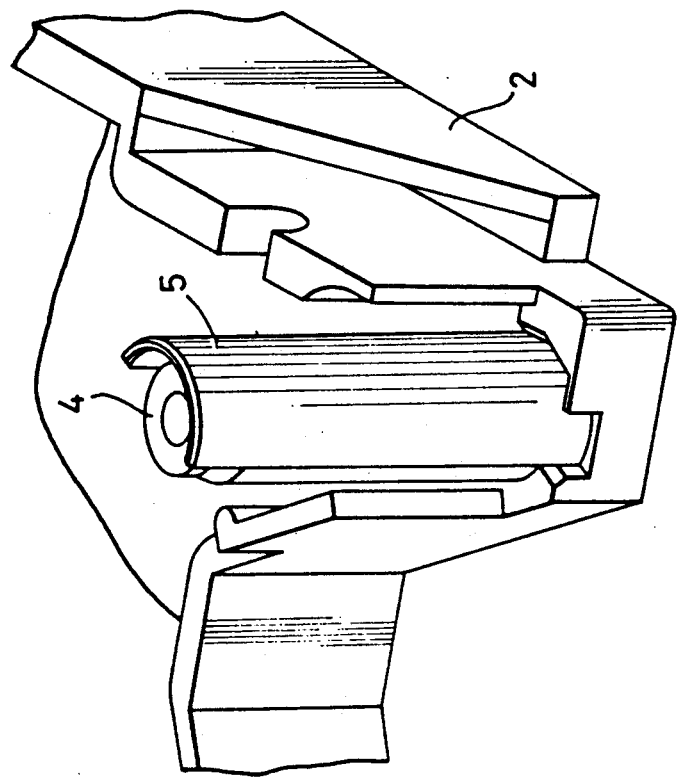
FIG. 14 is a front perspective view showing a semi-cylindrical tape guide and a supporting structure therefor according to another embodiment of the present invention.

Further formed in the tape supporting surface surrounding partially the base portion of the pin 4 is a semi-circular groove 12 which has a bottom surface at a lower level than the supporting surface (top surface of the platform) 10, as can be seen in FIGS. 6 and 7. The inner wall of this groove 1 is provided with an arcuate supporting rib 15 having a radius of curvature corresponding to the inner diameter of the semi-cylindrical tape guide, while the outer wall 13 of the groove 12 is configured in a polygonal shape capable of contacting the outer peripheral surface of the semi-cylindrical tape guide only at a small number of discrete points. Additionally, a pair of vertical grooves 14 are formed in the supporting pin 4 at positions corresponding to both lateral edges of the simi-spherical tape guide, respectively. By providing these vertical grooves 14, it is possible to press-fit the semi-cylindrical tape guide into the semi-circular groove 12 even when burrs should inadvertently be present in the side edges of the semi-cylindrical tape guide. Further, the top edge of the outer wall 13 of the groove 12 should preferably be chamfered, as indicated by a reference numeral 16 for thereby facilitating the press-fitting of the semi-cylindrical tape guide into the groove 12.

It should be added that the upper half 1 of the cassette casing is formed with a supporting surface (not shown) which is brought into contact with the top end of the cylindrical or semi-cylindrical tape guide 5 for holding it stationary when the upper half 1 is combined with the lower half 2.

In the cassette casing composed of the upper and lower halves 1 and 2 having the structure described above, both the cylindrical tape guide and the semi-cylindrical tape guide may be selectively employed in dependence on the types of the magnetic tapes or the types of the cassettes.

The mounting of the cylindrical tape guide can be accomplished simply by fitting it around the supporting pin 4 with the bottom end of the guide being supported by the supporting surface or platform 10 formed in the lower half of the cassette casing, as is illustrated in FIGS. 10 to 13. Subsequently, the upper half 1 is mounted on the lower half 2 and secured to the latter by screws. Thus, in the assembled state, the cylindrical tape guide 5 can be stationarily secured under the pressure exerted by the supporting surfaces of the upper and lower halves 1 and 2 of the cassette casing.

When the semi-cylindrical tape guide 5 is to be mounted in place of the cylindrical tape guide, the former is fitted around the supporting pin 4 and pressed into the semi-circular groove 12 until the bottom edge of the guide 5 has reached the bottom of the groove 12. In that case, the arcuate supporting rib 15 supports snugly the inner surface of the semi-cylindrical tape guide 5, while the polygonal outer wall 13 of the groove 12 contacts the outer peripheral surface of the semi-cylindrical tape guide 5 at a plurality of discrete points. Even when burrs remain on both lateral edges of the semi-cylindrical tape guide 5, the fitting thereof can be carried out without difficulty, involving no problem with regard to the positional accuracy, by virtue of the provision of the vertical grooves 14. When the upper half 1 of the cassette casing is mounted and secured by means of screws, the top end of the semi-cylindrical tape guide is then held stationary by the supporting surface (platform) formed in the upper half. In the case of the instant exemplary embodiment, the positioning of the tape guide is carried out primarily on the side of the lower half of the cassette casing.

In the above description of the embodiment of the invention, it has been assumed that the polygonal outer wall is made use of only for mounting the semi-cylindrical tape guide. However, it is equally possible to secure the cylindrical tape guide with the aid of the polygonal outer wall of the groove 12.

Figure 19:
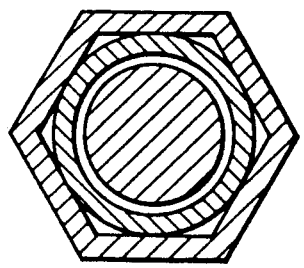
FIG. 19 is a horizontal sectional view showing a tape guide and a supporting structure therefor according to yet another embodiment of the present invention.
Figure 18B:
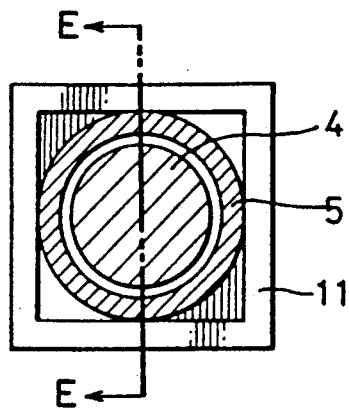
Figure 18A:
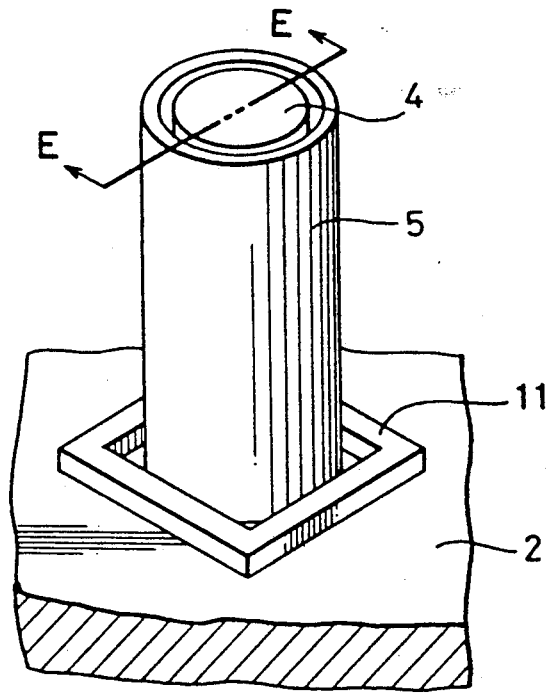
Figure 18C:
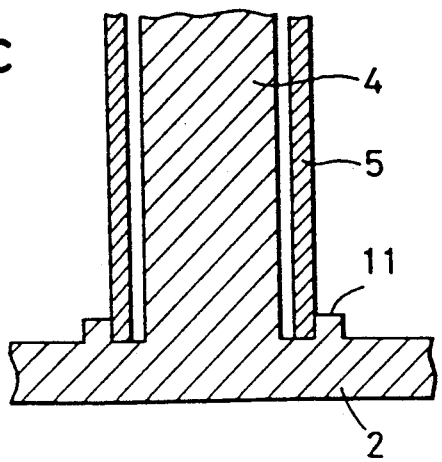

FIGS. 18(a) to 18(c) show an embodiment of the invention in which only the cylindrical tape guide 5 is to be employed. Referring to the figures, formed in the inner bottom surface of the lower casing half are a supporting pin 4 for supporting a cylindrical tape guide 5 fitted loosely around the pin 4 and a rib 11 of a predetermined height formed about the supporting pin 4, the rib 11 having a polygonal inner peripheral surface. The inner periphery of the polygonal rib 11 is so dimensioned that the polygonal inner wall of the rib 11 is brought into contact with the cylindrical tape guide at four discrete points. Upon mounting the cylindrical tape guide 5, it is first fitted around the supporting pin 4 and pressed into a groove defined between the supporting pin 4 and the polygonal rib 11. The outer periphery of the cylindrical tape guide at the lower end portion thereof then engages with the inner wall of the polygonal rib 11, whereby the cylindrical tape guide is held at the predetermined position. At that time, although the supporting pin 4 serves for determining the vertical position of the cylindrical tape guide, the pin 4 plays no role in determining the position of the bottom end portion of the cylindrical tape guide. However, by forming a similar rib in the upper casing half or a combination of the similar rib and a recess, positioning of the cylindrical tape guide can be automatically effectuated upon assembling of the upper and lower casing halves. Alternatively, the upper half of the cassette casing may be formed simply with a receiving hole of a size corresponding to the cross-section of the tape guide 5 for receiving therein the top end portion of the cylindrical tape guide FIG. 19 shows another embodiment of the tape guide structure according to the present invention. This embodiment differs from the one shown in FIG. 18 only in that a rib 12 having a hexagonal inner surface is used.

Figure 20:
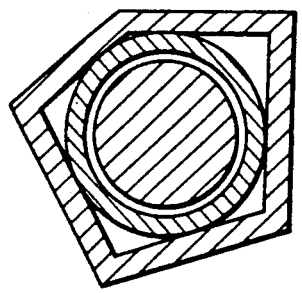
FIG. 20 is a horizontal sectional view showing a tape guide and a supporting structure therefor according to a further embodiment of the invention.

FIG. 20 shows still another embodiment of the tape guide structure which differs from the one shown in FIG. 18 only in that a rib 13 having a triangular inner surface is used. Parenthetically, at least one of the vertexes of the triangular inner surface may be omitted, as indicated by broken lines.

Figure 21:
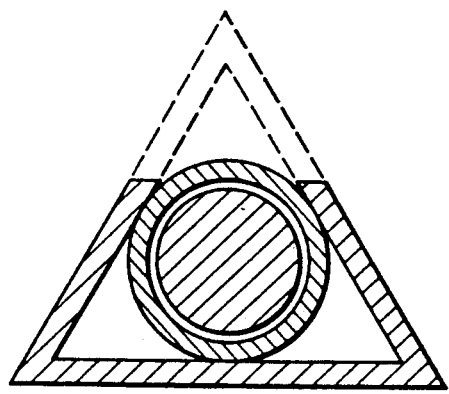
FIG. 21 is a horizontal sectional view showing a tape guide and a supporting structure therefor according to a still further embodiment of the invention.

FIG. 21 shows the tape guide and the supporting structure according to a further embodiment of the invention. As will be seen in the figure, a rib 14 having a pentagonal inner peripheral surface is employed, wherein each side of the pentagon contacts with the outer peripheral surface of the cylindrical tape guide 5 at one point in the positioning thereof.

Figure 22B:
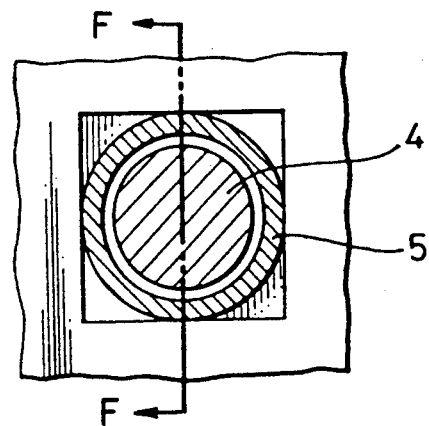
Figure 22A:
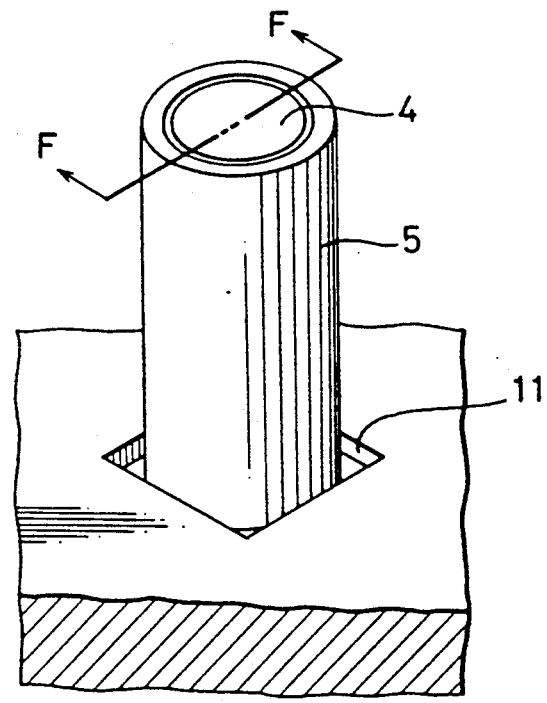
Figure 22C:
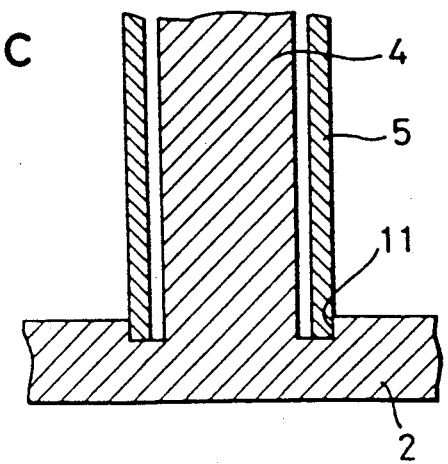

FIGS. 22(a) to 22(c) show a further embodiment of the present invention. In the tape guide structure according to this umbodiment, a rib 11 is realized by forming a polygonal concave in the lower casing half around the pin 4. With this supporting structure, a tape guide having a greater length than those described hereinbefore can be used, whereby the guide area for the magnetic tape is correspondingly increased.

In the following, exemplary embodiments of the supporting structure for both the semi-cylindrical tape guide and the cylindrical tape guide will be described.

Figure 23B:
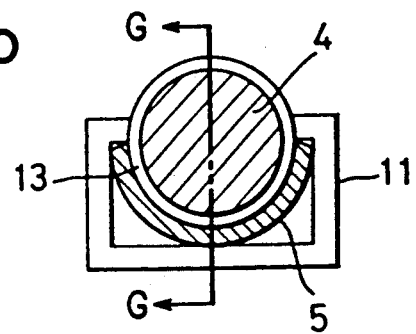
Figure 23A:
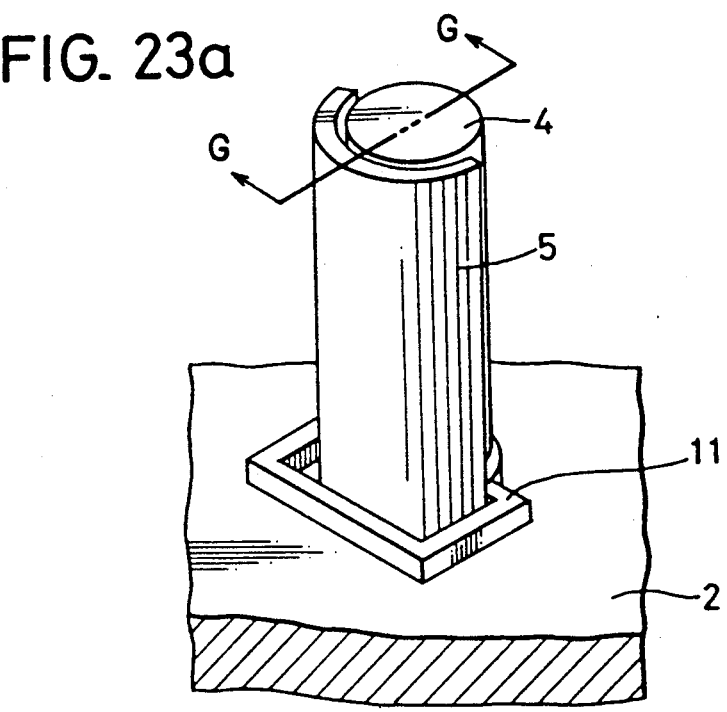
Figure 23C:
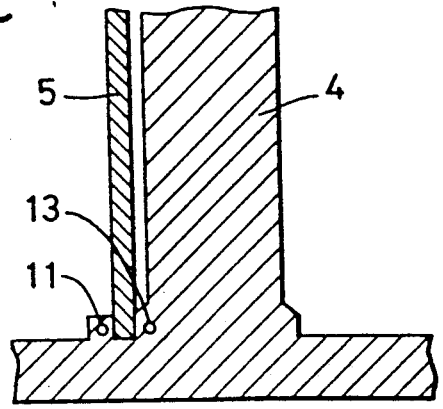

Referring to FIG. 23, the semi-cylindrical tape guide 5 is supported around the cylindrical supporting pin 4 having a base portion 13 of a diameter which is greater than that of the remaining portion and which substantially coincides with the inner diameter of the tape guide 5. A rectangular rib 11 is formed in the lower casing half 2, wherein one side is broken into two parts which engage with the base portion of the supporting pin 4, while the other three sides are adapted to contact pointwise with the tape guide 5. Further, the broken pieces of the one side of the rectangular rib 11 engaging the supporting pin 4 also engage the lateral edges of the semi-cylindrical tape guide 5 for positioning it in the circumferential direction. By forming the similar rib and using the like supporting pin or forming the similar rib and a corresponding concave in the upper casing half, the desired positioning of the tape guide can be realized upon assembling together the upper and lower halves of the cassette casings. Alternatively, a receiving concave having a cross-section corresponding to that of the combined pin 4 and tape guide 5 may be formed in the upper casing half for supporting the tape guide at the top end portion thereof.

Figure 24B:
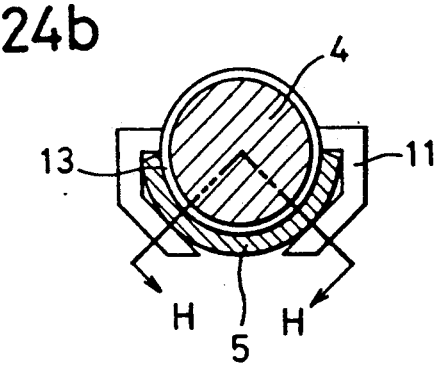
Figure 24A:
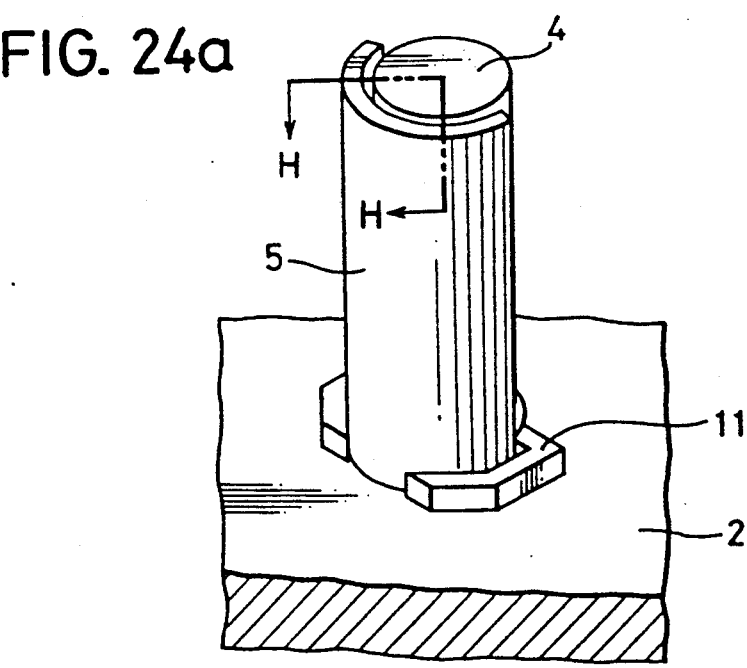
Figure 24C:
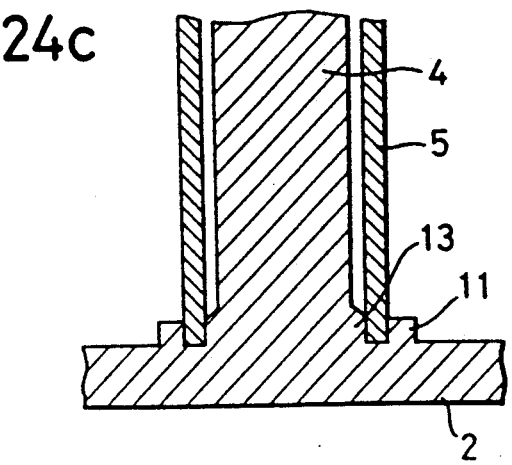

FIGS. 24(a), 24(b) and 24(c) show another exemplary embodiment of the invention. This embodiment differs from the preceding one in that the rib 11 is so formed as to have four linear inner peripheral sides for the position control.

FIG. 25 shows still another embodiment of the invention which differs from the one shown in FIG. 24 in that a similar position controlling or delimiting rib 14 is integrally provided on the top portion of the supporting structure in addition to the bottom one. Thus, according to the instant embodiment, it is possible to perform positively the accurate positioning of the tape guide 5 regardless of whether the upper casing half is mounted or not.

Figure 26B:
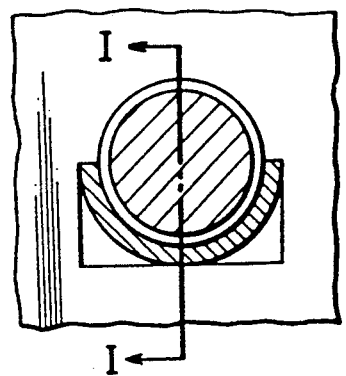
Figure 26A:
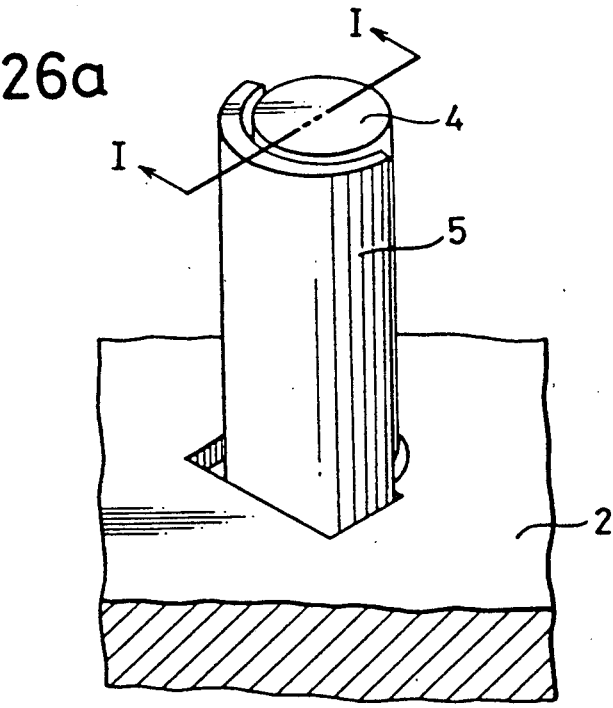
Figure 26C:
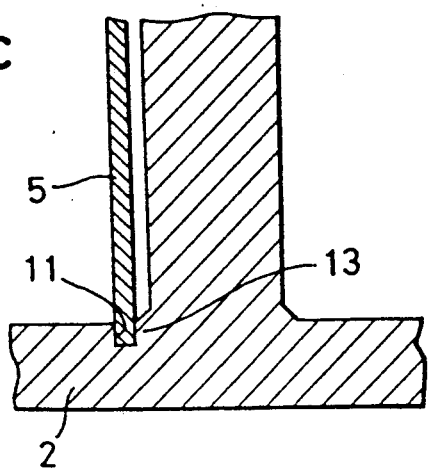

FIG. 26 shows a further embodiment of the present invention. In the case of this illustrative structure, the rib 11 is realized by forming a groove in the lower casing half around the foot or base portion 13 of the supporting pin 4.

In connection with the embodiments of the invention shown in FIGS. 23, 24, 25, it has been described that the foot or base portion of the supporting pin 4 has a diameter differing from that of the other portion of the supporting pin. It should however be understood that the diameter of the base portion of the pin 4 may be same as that of the other portion to the substantially same effect.

As will be appreciated from the foregoing description, there can be obtained a tape cassette provided with an improved tape guide structure which can ensure excellently advantageous effects in the mounting of a cylindrical and/or semi-cylindrical tape guide and can be used either for the cylindrical tape guide or the semi-cylindrical tape guide. Further, since the same casing half can be used even when the tape guide is selected in conformance with the type of the tape to be used, high efficiency of assembling process as well as inexpensiveness of the casing halves can be accomplished. Further, even when the tape guide provided on the tape feeding side differs in the shape from the guide disposed on the sending side, it is possible to use the supporting structure of the same configuration. Besides, upon positioning the cylindrical and/or semi-cylindrical tape guide, the outer peripheral surface of the tape guide finished with high precision is brought into engagement with the polygonal outer wall through only a small number of point contacts. Accordingly, by determining these contact points accurately, the precise positioning can be accomplished. To this end, a molding die provided with the small number of points with high precision can be designed and manufactured extremely easily when compared with the die required for forming the annular rib having a true circularity with high precision.

We claim:

1. A magnetic tape cassette comprising a cassette casing composed of upper and lower casing halves and including at least one fixed tape guide having an upper and lower end, said fixed tape guide being disposed along a tape transporting path defined within said cassette casing, said magnetic tape cassette characterized in that said fixed tape guide has a semi-cylindrical configuration and said tape guide upper and lower ends are fixedly secured to inner surfaces of said upper casing half and said lower casing half, respectively, by press-fitting said tape guide upper end into a groove defined in said upper casing half inner surface, and by press-fitting said tape guide lower end into a groove defined in said lower casing half inner surface, each of said grooves being defined by an outer wall and an inner wall, wherein said groove outer wall is of a continuous or discontinuous polygonal shape and is so dimensioned such that said groove outer wall contacts and supports an outer periphery of said tape guide ends at a plurality of points, and wherein said groove inner wall is an at least partially cylindrical wall which supports an inner periphery of said tape guide ends.

2. A magnetic tape cassette comprising a cassette casing composed of upper and lower casing halves and including at least one fixed tape guide having an upper and lower end, said tape guide being disposed fixedly along a tape transporting path defined within said cassette casing, said magnetic tape cassette characterized in that said fixed tape guide has a partially or completely cylindrical configuration and at least one of said tape guide ends is fixedly secured to at least one of said casing halves by press-fitting said at least one of said tape guide ends into a groove defined in an inner surface of said at least one of said casing halves, said groove being defined by an outer wall and an inner wall, wherein said groove outer wall is of a continuous or discontinuous polygonal shape and is so dimensioned such that said groove outer wall contacts and supports an outer periphery of said at least one of said tape guide ends at a plurality of points, and wherein said groove inner wall is an at least partially cylindrical wall which supports an inner periphery of said at least one of said tape guide ends.

3. A magnetic tape cassette according to claim 2, wherein said fixed tape guide has a cylindrical shape, wherein said magnetic tape cassette further comprises a supporting pin for said fixed tape guide, said supporting pin being anchored to the inner surface of said at least one of said casing halves and being dimensioned such that said tape guide can fit over said supporting pin, and wherein said tape guide is fitted over said supporting pin.

4. A magnetic tape cassette according to claim 2, wherein said fixed tape guide has a semi-cylindrical shape, wherein said magnetic tape cassette further comprises a supporting pin for said fixed tape guide, said supporting pin being anchored to the inner surface of said at least one of said casing halves and being dimensioned such that said tape guide can fit over said supporting pin, and wherein said tape guide is fitted over said supporting pin.

5. A magnetic tape cassette according to claim 4, wherein said fixed semi-cylindrical tape guide is disposed along a transporting path of a magnetic tape in such an orientation that said magnetic tape can be guided by said semi-cylindrical tape guide.

6. A magnetic tape cassette according to claim 2, further comprising a supporting pin wherein said supporting pin is formed with axially extending recesses at portions corresponding, respectively to both of said ends of said fixed semi-cylindrical tape guide to receive said tape guide ends.

7. A magnetic tape cassette according to claim 2 further comprising a supporting pin, wherein outer walls are formed in a base portion of said supporting pin, said outer walls of said supporting pin base portion contacting both of said ends of said fixed semi-cylindrical tape guide.

8. A magnetic tape cassette according to claim 7, wherein a chamfered guide portion is formed in one of said outer walls formed in said supporting pin base portion, and contacts both of said ends of said fixed semi-cylindrical tape guide.

* * * * *